May 15, 1962 J. A. PURSLEY 3,034,861
PROCESS FOR PREPARING HYDRAZINE
Filed June 26, 1959
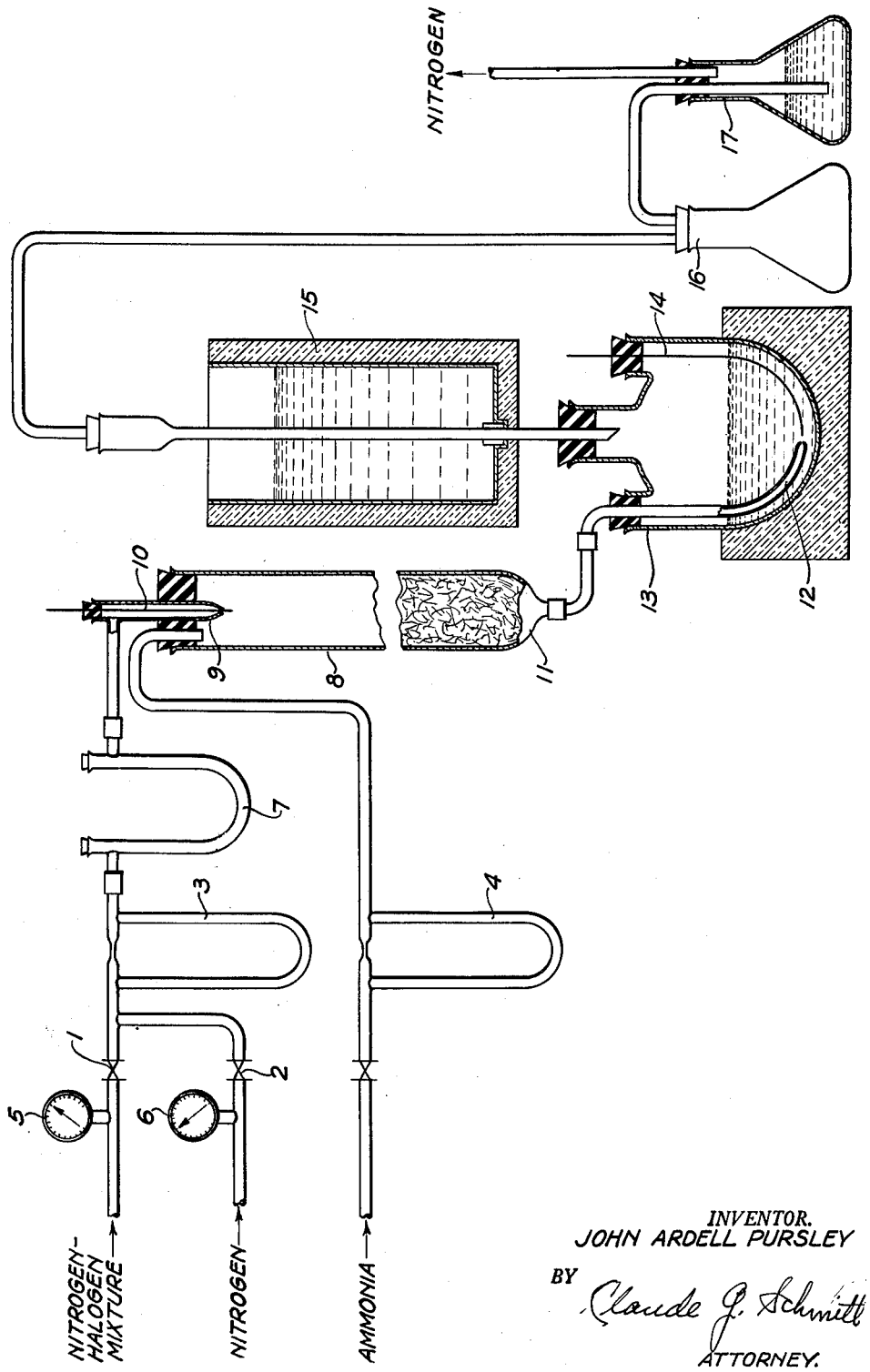
INVENTOR.
JOHN ARDELL PURSLEY
BY
*Claude J. Schmitt*
ATTORNEY.

United States Patent Office 3,034,861
Patented May 15, 1962

3,034,861
PROCESS FOR PREPARING HYDRAZINE
John A. Pursley, 2 E. Water St., Lock Haven, Pa.
Filed June 26, 1959, Ser. No. 823,261
16 Claims. (Cl. 23—190)

This invention relates to a process for preparing hydrazine.

Hydrazine has been found to be useful as a rocket fuel and as an intermediate in the preparation of various chemicals, e.g. isonicotinic acid hydrazine and B-hydroxynaphthalazine, the latter being a brilliant fluorescent yellow pigment.

While hydrazine has been known for a long time (since 1887 when first isolated by Curtius, Ber. 20, 1632), its large-scale production at an economical cost has not yet been accomplished. Hydrazine has been prepared by a number of methods, perhaps the best known of which is the Raschig method (United States Patent No. 910,858, dated January 26, 1909), and modifications thereof (Mattair and Sisler, J. Am. Chem. Soc. 73, 1619 (1951)). In accordance with the Raschig method, sodium hypochlorite reacts with ammonia fairly rapidly to form chloramine, in accordance with the following chemical equation:

$$NaOCl + NH_3 \rightarrow NH_2Cl + NaOH$$

Excess ammonia then reacts with the chloramine and sodium hydroxide to give hydrazine in accordance with the following chemical equation:

$$NH_2Cl + NH_3 + NaOH \rightarrow H_2N-NH_2 + NaCl + H_2O$$

The second reaction is a slow reaction and it competes with a third reaction, with the result that the yield of hydrazine is reduced. The third reaction can be represented by the following chemical equation:

$$2NH_2Cl + H_2N-NH_2 \rightarrow 2NH_4Cl + N_2$$

I have now found a new process for preparing hydrazine which has a higher reaction rate for the synthesis step than the hitherto known processes.

It is accordingly an object of my invention to provide a new and improved process for preparing hydrazine. Other objects will become apparent hereinafter.

In accordance with my new process, I prepare hydrazine by reacting at least one haloamine with at least one material selected from the group consisting of the metals of Groups IA and IIA of the Periodic Classification of Elements (based on atomic numbers), and the amides thereof. The Periodic Classification referred to herein is that according to Deming. A copy of the Deming Periodic Table appears on page 314 of the Handbook of Chemistry and Physics, 27th edition, published by Chemical Rubber Publishing Company in 1943.

Advantageously, the haloamine employed in practicing my new process is chloramine ($NH_2Cl$) or fluoramine ($NH_2F$), although less advantageously other haloamines in which the halogen is other than chlorine or fluorine can be employed, e.g. bromine.

The amides of the metals of Group IA (e.g. the alkali metals, e.g. sodium, potassium, caesium and rubidium) and the amides of the metals of Group IIA (e.g. the alkaline earth metals, e.g. strontium and barium) are most advantageously employed in practicing my new process. Amides of lithium (Group IA) and magnesium and calcium (Group IIA), generally speaking are less advantageously employed.

The reaction between the haloamine and the metal or metal amide may be accomplished simply by effecting an intimate contact between the reactants. Thus, for example, the reaction may be accomplished by passing the haloamine in contact with particulate solid metal or metal amide. Preferably the haloamine is diluted with a nonreactive gas such as N, $NH_3$ and the like.

Advantageously, the reaction is carried out in a nonaqueous medium. Liquid ammonia is an especially efficacious medium. The process can be carried out at any convenient temperature and pressure, but is advantageously carried out at atmospheric pressure at the temperature of liquid ammonia ($-33.5°$ C.). Temperatures from $-50°$ to $+75°$ C. are readily employed. Higher pressures and temperatures higher than the boiling point of liquid ammonia at atmospheric pressure can be employed. Other nonaqueous media which may be employed include ethers such as diethyl ether; dimethyl formamide; and the like.

Various forms of apparatus can be employed in carrying out my new process. However, one convenient form is shown in the accompanying drawing where the rate of addition of halogen and ammonia (to form haloamine) are controlled by two parallel control systems consisting of supply tanks (not shown), needle valves 1 and 2 and capillary flow meters 3 and 4. In addition to the differential flows indicated on the flow meters, the integrated halogen volume was determined from the decrease in tank pressure by means of a 100 p.s.i. gauge 5. The nitrogen tank, equipped with a 2000 p.s.i. gauge 6, was manifolded with the halogen tank, so that the nitrogen rate could be controlled while purging and when bromine was used. When used, bromine was added to the U-tube 7 where it could evaporate into the nitrogen stream. The halogen (which may be diluted with an inert gas, e.g. nitrogen) was introduced into the reactor 8 through an annular nozzle 9 containing a movable wire 10 to keep the nozzle free of ammonium halide deposits. The ammonia was introduced directly into the reactor.

The reactor is a glass tube with a two-inch diameter and twenty-five inch length. The discharge end 11 is firmly packed with about six inches of glass wool which is for the purpose of removing the ammonium halide formed by the reaction:

$$X_2 + 2NH_3 \rightarrow XNH_2 + NH_4X$$

where X represents a halogen atom.

The gaseous products from the reactor are introduced through a capillary tube 12 beneath the liquid ammonia level into a three-necked, 500 cc. insulated glass flask 13 seated in Foamglas insulation. An iron wire 14 in one of the smaller necks of the flask is useful if one desires to synthesize metal amides in the flask according to the chemical equation:

$$Z + NH_3 \rightarrow ZNH_2 + (\tfrac{1}{2})H_2$$

where Z represents a metal atom.

In the flask 13, the metal amide reacts with the haloamine to form hydrazine and a metal salt according to the following chemical equation:

$$ZNH_2 + XNH_2 \rightarrow H_2N-NH_2 + ZX$$

where Z represents a metal atom and X represents a halogen atom.

Ammonia and haloamine vapors escaping from the reaction mixture are refluxed back into the reaction mixture by a condenser 15 cooled with a solid carbon dioxide-methanol mixture, while the diluent nitrogen, decomposition products and hydrogen pass through the trap 16 and water-filled bubbler 17.

The following examples will serve to illustrate further the manner of practicing my new process:

EXAMPLE 1

*Hydrazine From Metal Amides*

In operating my new process employing the apparatus shown in the accompanying drawing, the apparatus was first purged with nitrogen. The condenser was cooled with a solid carbon dioxide and methanol mixture. Ammonia was then passed into the apparatus until about 100 cc. of liquid ammonia had condensed in the 500 cc. flask 13. A predetermined weight (see below) of finely divided metal was then added to the liquid ammonia. The metal amide was then formed by agitating the liquid ammonia by passing nitrogen into the flask, the formation of the metal amide being catalyzed by the iron wire 14. Agitation was continued until the blue color of the liquid ammonia solution disappeared, indicating that the metal was completely converted to the metal amide. After the metal amide was formed, the iron wire was removed and the neck of the flask, where the wire had been was securely stoppered. Ammonia was admitted to the apparatus through needle valve 2 at a rate of about 600 cc. per minute at about 25° C. and about 760 mm. of Hg pressure. Halogen (e.g. approximately 20 percent chlorine in nitrogen) was admitted to the apparatus through needle valve 1 at a rate of about 133 cc. per minute S.T.P. which was equivalent to a pressure drop of two pounds per hour in the supply tank. These rates were maintained substantially constant for a period of one-half hour. At the end of such period, the apparatus was again purged with nitrogen. The 500 cc. flask was then disconnected from the apparatus and the excess ammonia boiled off by heating the flask on a steam bath for about one-half hour. The residue in the flask was then dissolved in 50 cc. of water and acidified with a few drops of hydrochloric acid.

The aqueous mixture can be analyzed for hydrazine content as follows: 5 cc. of the aqueous mixture were added to 100 cc. of hot methanol containing 1.074 grams of B-hydroxynaphthaldehyde. The fluorescent yellow precipitate which formed was filtered off hot, washed with 25 cc. of methanol to remove unreacted aldehyde and 25 cc. of water to remove halides. The precipitate was dried at 50° C. and weighed. From the weight of the precipitate, the amount of hydrazine present in the aqueous solution can be calculated from the following chemical equation:

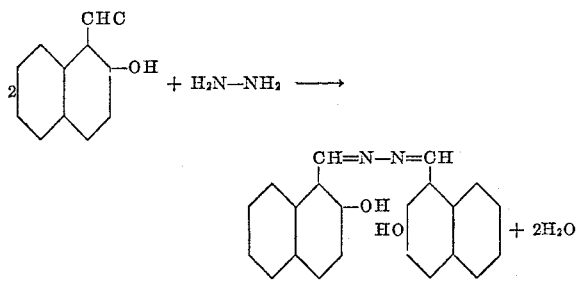

Operating as described above, the results shown in the following tabulation were obtained by reacting metal amides with chloramine, in liquid ammonia, at about −33.5° C.

Metal amide (grams):      Hydrazine (percent yield)
Sodium amide (equivalent to 0.696 gr. Na) _____ 56
Potassium amide (equivalent to 1.090 gr. K) ____ 66
Barium amide (equivalent to 2.022 gr. Ba) _____ 38

Exactly the same procedure was followed without the addition of a metal. Without the amide no appreciable quantity of hydrazine was produced, thereby, proving that under these conditions the reaction between chloramine and ammonia is negligible and that under equivalent conditions the synthesis of hydrazine by the reaction of metal amides and chloramine is very much faster than by the reaction of ammonia with chloramine.

EXAMPLE 2

*Hydrazine From Metals in Ammonia*

When operating with metals in ammonia, the procedure was exactly as set forth above in Example 1, except that the reaction time was one hour instead of one-half hour, and the finely divided metal was merely added to the liquid ammonia and not converted to the metal amide. Accordingly, the iron wire 14 was not used and the ammonia and chlorine were admitted to the apparatus through needle valves 1 and 2 immediately after the metal was added to the liquid ammonia.

Operating as described above, the results shown in the following tabulation were obtained by reacting metal with chloramine, in liquid ammonia, at about −33.5° C.

Metal (grams):      Hydrazine (percent yield)
Sodium, 1.416 _____ 52
Magnesium, 0.720 _____ 32

The preceding examples illustrate the principle of this new process, but other methods of conducting the operation may also be useful in commercial production. One particularly convenient method is to electrolyze the metal halide in liquid ammonia forming the metal amide and haloamine at the cathode and anode respectively with subsequent reaction of the metal amide and haloamine to form hydrazine. Care must be exercised to avoid the formation of hydrazine near the anode where it may be decomposed. The reaction products can be separated by electrodialysis, evaporation, ion-exchange, adsorption and other means. The product will be anhydrous hydrazine, and the by-product salt and unreacted ammonia will be returned to the reaction system.

Hydrazine can be separated from the residue, which contains the salt and hydrazine and remains after the evaporation of ammonia according to the above example, by heating the salt deposit gently while passing a small stream of dry nitrogen over the heated salt deposit. The nitrogen serves to strip out the hydrazine vapor. The hydrazine can be separated from the nitrogen gas by passing the hydrazine-containing nitrogen through a glass tube into the bottom of a condenser trap having an open top, e.g. a test tube which is submerged, save for the top-most portion, in ice-water. The nitrogen gas vents off at the open top of the so-submerged tube. The condensate so obtained from the nitrogen gas does not freeze in the trap, owing to small concentrations of water or ammonia which are present and which depress the melting point of the hydrazine which melts at 1.4° C. Upon heating the condensate in the test tube (which condensate has the characteristic odor of hydrazine) by heating the bottom of the test tube in a mineral oil bath, the condensate vaporizes and condenses on the cooler upper portions of the tube. The temperature at which such condensation became appreciable was 113° C., at a pressure of about 745 mm. of Hg.

EXAMPLE 3

*Hydrazine From Metal Amides and Haloamines*

Potassium amide was formed following the procedure of Example 1. After the potassium amide was formed, the liquid ammonia was evaporated from the 500 cc. flask leaving potassium amide. Halogen (e.g. approximately 20 percent chlorine in nitrogen) was admitted to the apparatus through needle valve 1 at a rate of about 133 cc. per minute S.T.P. which was equivalent to a pressure drop of two pounds per hour in the supply tank. These rates were maintained substantially constant for a period of one-half hour. At the end of such period, the apparatus was again purged with nitrogen. The residue in the flask then was dissolved in 50 cc. of water and acidified with a few drops of hydrochloric acid.

The test set forth in Example 1 confirmed the presence of hydrazine in the dissolved residue. The total reaction was accomplished in the absence of a liquid medium.

This application is a continuation-in-part of application Serial Number 306,694, entitled "Process for Preparing Hydrazine," and now abandoned.

I claim:
1. A process for preparing hydrazine which comprises contacting at least one haloamine of the formula halo-$NH_2$ containing a halogen having an atomic number not greater than that of bromine with at least one material selected from the group consisting of the metals of Groups IA and IIA of the Periodic Classification of Elements and the amides thereof.

2. The process of claim 1 wherein at least one haloamine is contacted with a metal amide.

3. A process for preparing hydrazine which comprises contacting chloramine with at least one metal amide in which the metal is a metal of Group IA of the Periodic Classification of Elements.

4. A process for preparing hydrazine which comprises contacting chloramine with at least one metal amide in which the metal is a metal of Group IIA of the Periodic Classification of Elements.

5. A process for preparing hydrazine which comprises contacting fluoramine with at least one metal amide in which the metal is a metal of Group IA of the Periodic Classification of Elements.

6. A process for preparing hydrazine which comprises contacting fluoramine with at least one metal amide in which the metal is a metal of Group IIA of the Periodic Classification of Elements.

7. A process for preparing hydrazine which comprises reacting, in liquid ammonia, at least one haloamine of the formula halo-$NH_2$ containing a halogen having an atomic number not greater than that of bromine with at least one metal amide selected from the group consisting of amides of metals of Groups IA and IIA of the Periodic Classification of Elements.

8. A process for preparing hydrazine which comprises reacting, in liquid ammonia, at least one haloamine of the formula halo-$NH_2$ containing a halogen having an atomic number not greater than that of bromine with at least one metal selected from the group consisting of metals of Groups IA and IIA of the Periodic Classification of Elements.

9. The process for preparing hydrazine which comprises reacting, in liquid ammonia, chloramine with at least one metal amide selected from the group consisting of amides of metals of Groups IA and IIA of the Periodic Classification of Elements.

10. The process for preparing hydrazine which comprises reacting, in liquid ammonia, fluoramine with at least one metal amide selected from the group consisting of amides of metals of Groups IA and IIA of the Periodic Classification of Elements.

11. The process for preparing hydrazine which comprises reacting, in liquid ammonia, a haloamine of the formula halo-$NH_2$ containing a halogen having an atomic number not greater than that of bromine with an alkaline metal amide.

12. A process for preparing hydrazine which comprises reacting, in liquid ammonia, chloramine with sodium amide.

13. A process for preparing hydrazine which comprises reacting, in liquid ammonia, chloramine with potassium amide.

14. A process for preparing hydrazine which comprises reacting, in liquid ammonia, chloramine with barium amide.

15. A process for preparing hydrazine which comprises reacting, in liquid ammonia, fluoramine with sodium amide.

16. A process for preparing hydrazine which comprises reacting, in liquid ammonia, fluoramine with potassium amide.

References Cited in the file of this patent
UNITED STATES PATENTS

| | | |
|---|---|---|
| 910,858 | Raschig | Jan. 26, 1909 |
| 2,373,800 | Acken et al. | Apr. 17, 1945 |

OTHER REFERENCES

Mellor: "Comprehensive Treatise on Inorganic and Theoretical Chemistry," Longmans, Green and Co., N.Y., vol. 8, pages 253, 256, and 605.

Audrieth and Ogg: "The Chemistry of Hydrazine," John Wiley and Sons, Inc., N.Y., 1951, page 29.